Dec. 30, 1958 C. M. WESTFALL ET AL 2,866,606

WELDING ROD REEL

Filed Oct. 20, 1953 2 Sheets-Sheet 1

Inventors
Clifford M. Westfall,
Kenneth M. Mead,
By Schroeder, Merriam,
Hofgren & Brady, Attys.

Dec. 30, 1958 C. M. WESTFALL ET AL 2,866,606
WELDING ROD REEL

Filed Oct. 20, 1953 2 Sheets-Sheet 2

Inventors:
Clifford M. Westfall,
Kenneth M. Mead,
By Schroeder, Merriam,
Hofgren & Brady, Attys.

2,866,606

WELDING ROD REEL

Clifford M. Westfall, Homewood, and Kenneth M. Mead, Blue Island, Ill., assignors to Chicago Bridge & Iron Company, a corporation of Illinois Application October 20, 1953, Serial No. 387,262

1 Claim. (Cl. 242—110.2)

This invention relates to welding and more particularly to apparatus for supporting a coil of welding wire to be fed to a joint for welding.

Submerged arc welding processes have used welding wire in long lengths as contrasted to the manual use of a relatively short rod measuring only a few inches in length. The automatic welding machines used with submerged arc welding can continuously deposit weld metal so that a coil of wire continuously fed to a joint permits considerably longer operating time without time off for changing weld rods as is required in manual welding. Welding wire furnished in reels has been supported in the past on a stationary reel structure made of insulating material. The wire itself rotated on the reel and was fed continuously to a nozzle which positioned the wire at the joint. One difficulty with such reels has been their limited capacity for receiving a great amount of welding wire and another difficulty has been the amount of pull required to take the wire from the reel.

In supporting relatively heavy coils of welding wire there is the necessity of insulating the coil from the welding machinery with which it is used and preferably providing a means permitting the welding wire supporting reel to rotate so as to feed off the welding wire. It is also preferable to keep the structure light in weight, particularly where used with a traveling welding apparatus such as disclosed in the co-pending application of Perry C. Arnold, Serial No. 131,223, filed December 5, 1949, now Patent No. 2,713,106, issued July 12, 1955. In the above application, the welding machine disclosed is for the purpose of traveling on the upper edge of an upright plate to weld a horizontal joint at the lower edge of the plate such as may be found in the girth joints of field erected liquid storage tanks.

Accordingly, the present invention is concerned with the structure of a welding wire supporting reel which avoids the difficulties mentioned above and which has the advantages of being capable of rotation, being insulated from the supporting structure and capable of holding a considerably larger quantity of welding wire than previous reels. A preferred embodiment of the invention is illustrated in the accompanying drawings, in which.

Figure 1:
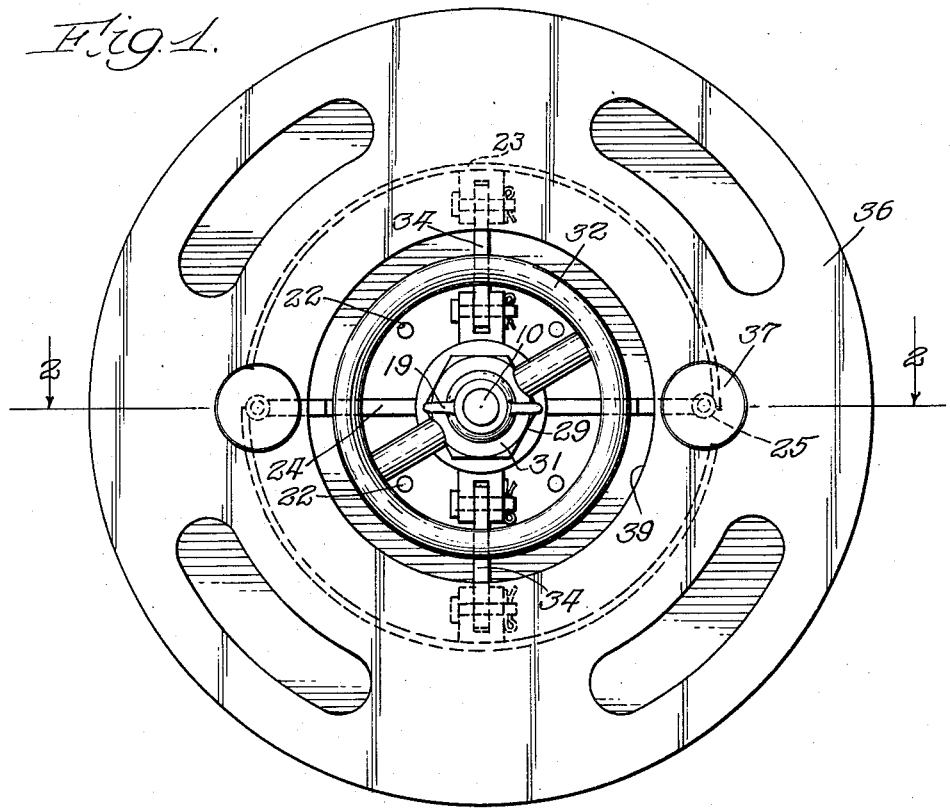
Figure 1 is a front plan view of the reel of this invention.
Figure 2:
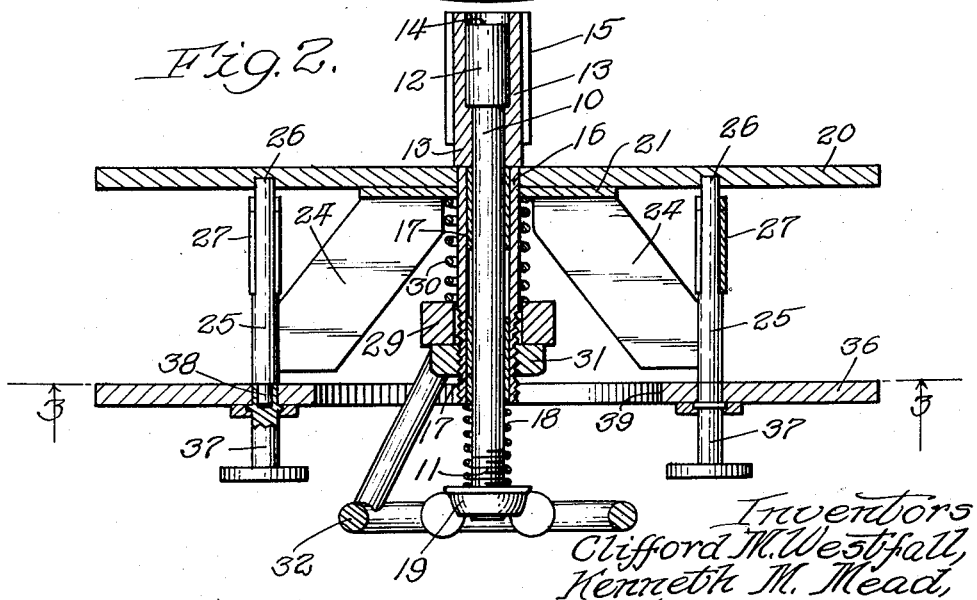
Figure 2 is a horizontal sectional view through the reel taken substantially along line 2—2 in Figure 1.

The reel structure is supported primarily by a spindle 10 of metal having its outer end threaded as at 11 and an enlarged inner portion 12 mounted together with a portion of the main section of the spindle within a sleeve 13 of fiber or other electrical insulating material with the inner end 14 of the enlarged end 12 terminating short of the inner end of the sleeve. A metal casing 15 surrounds the fiber sleeve 13 for most of its length so that a support for the spindle may be formed by welding the casing 15 to a part of a welding apparatus such as referred to in said Arnold application Serial No. 131,233.

In this manner, the spindle 10 is electrically insulated from the machine to which it is secured. A metal sleeve 16 is rotatably supported on the spindle by a pair of graphite impregnated brass bearings 17. This sleeve is urged toward the fiber sleeve 13 by means of a compression spring 18 bearing against its outer end and also against a thumb nut 19 on the threaded end 11 of the spindle. This sleeve can thus rotate on the spindle end with little friction because of the graphite bearings.

The reel itself includes generally an inner fiber disk 20 having a central opening to fit closely about the metal sleeve 16 and an outer fiber disk 36, the two disks being spaced apart a sufficient distance to accommodate the desired length of wire wound on core plates 23. A circular metal plate 21 smaller than the disk 20 is secured to the inner disk by means of pins or the like 22 and also has a central opening of proper size to fit closely about the metal sleeve 16. The supporting structure for the welding wire carries the weight of the wire directly to the metal sleeve 16. To accomplish this, a pair of metal angle braces 24 extend radially from the metal plate 21 to a pair of posts 25, the inner ends 26 of which are mounted in corresponding openings in the disk 20. The posts extend outwardly substantially parallel to the spindle 10. Any weight placed on the posts by the welding wire may thus be transferred through the angle braces 24 and plate 21 directly to the metal sleeve 16 having its bearing on the spindle.

Figure 3:
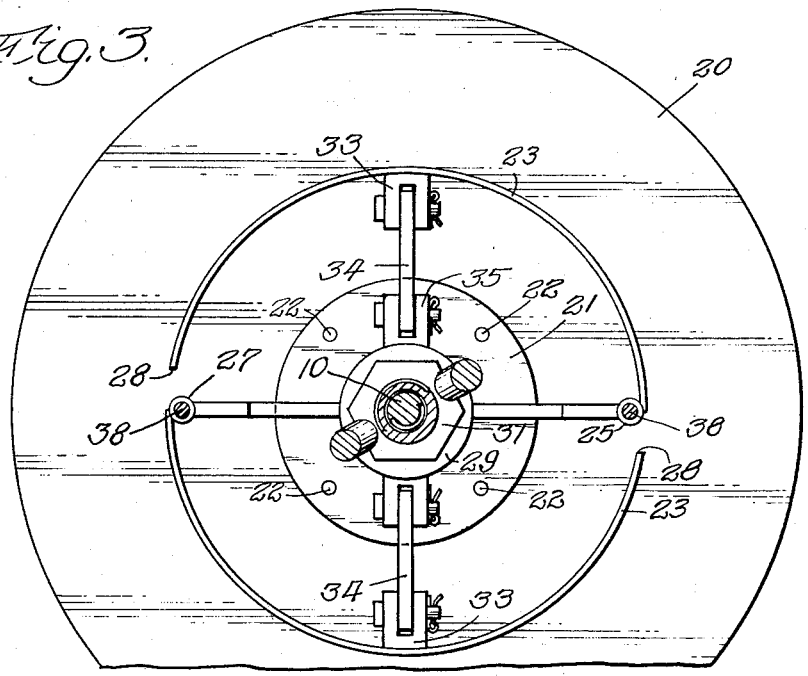
Figure 3 is a sectional plan view taken substantially along line 3—3 in Figure 2.
Figure 4:
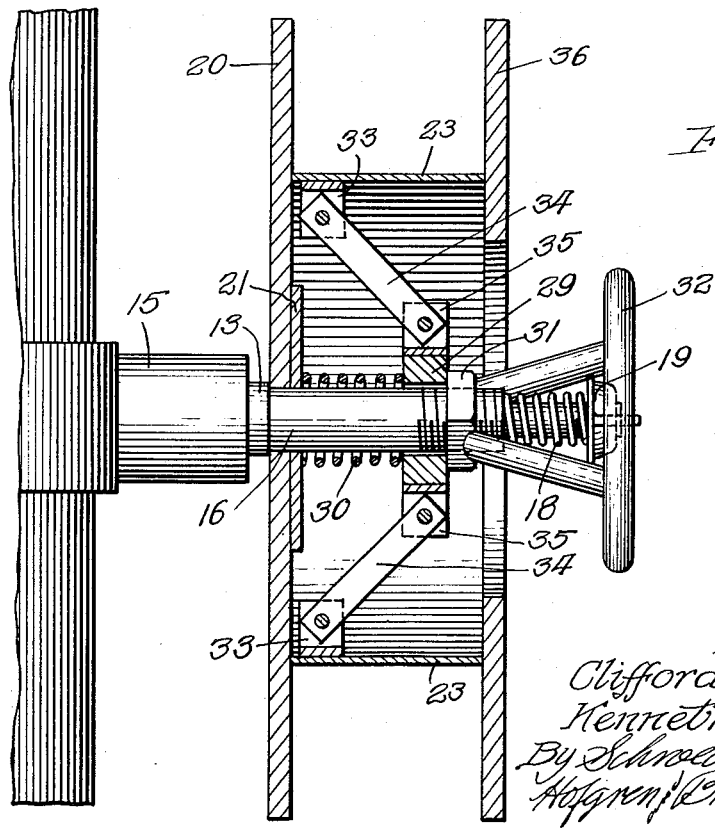
Figure 4 is a vertical sectional view through the reel shown in Figure 1.

As illustrated in Figures 3 and 4, the base or core of the wire reel between disks 20 and 36 comprises a pair of arcuate plate core members 23, each pivotally mounted at one end on a sleeve 27 on one of the posts 25. The opposite end 28 of each arcuate base member is free.

Welding wire as supplied by a manufacturer is made up into a right cylinder, however subsequent handling and shipping often causes the wire to shift considerably and enter an oblique cylinder. If the circular base or core formed by the arcuate members 23 is sufficiently small to fit into a reel of welding wire which is an oblique cylinder, the wire has a tendency to roll off of such a loosely held reel until a loop of wire may extend sufficiently far from the main body of the reel to touch another part of the welding apparatus and short out the welding operation. To avoid such happening, we have provided a mechanism for expanding the core outwardly against the reel of wire to take up all slack. In the present invention a linkage mechanism is used to expand the arcuate members 23 outwardly against a reel of welding wire. A collar 29 is slidably mounted on the outer end of metal sleeve 16 and yieldingly urged outwardly by compression spring 30. A nut 31 is threadably mounted on sleeve 16 and bears against the collar 29. A hand wheel 32 is connected to the nut 31 so that turning of the hand wheel can move the collar longitudinally of the spindle. A clevis 33 is secured to the central portion of each arcuate base member 23 and connected by a link 34 to a similar clevis 35 secured to the collar 29. Thus it will be noted that movement of the collar causes the arcuate members to expand outwardly or contract inwardly depending upon the direction of movement of the collar under control of the hand wheel.

To complete the wire supporting reel the outer cover member 36 is secured to the outer ends of the posts 25 by knobs 37 threaded to the threaded outer ends 38 of the posts. This cover member has a large central opening 39 so as to fit over the hand wheel 32. The welding wire reel is thus completed on the outer side by the cover disk 36.

With the present reel structure, coils of wire weighing 100 pounds may be easily handled whereas previous reels of the stationary type were often limited to 25 pounds. The difficulty with wire unraveling from the reel and shorting out against the welding apparatus is also avoided since the wire may be held taut on the reel. An additional advantage of the structure of the reel is that it permits an adjustment of the force needed to pull the wire from the reel. A variation in this force causes fluctuation in the arc voltage which, in turn, tends to cause a poor weld. With the present rod reel structure, the amount of compression on spring 18 may be varied by turning the nut 19 on the threaded end of the spindle 11. Thus, if the reel turns too freely, a tightening of nut 19 will increase the amount of drag or the friction of the reel on its bearing. This control thus can supplement the voltage control of the drive motor which pulls the welding wire from the reel.

The structure may be made in light weight by using aluminum castings for the wire supporting brace members 24 and the posts 25, as well as for the hand wheel, collar and linkage mechanism. It is also preferred that the arcuate base members be of light weight castings. Sufficient strength is maintained while providing a light weight structure.

The foregoing detailed description has been given for clearness of understanding only, and no unnecessary limitations should be understood therefrom, for some modifications will be obvious to those skilled in the art.

We claim:

A welding wire supporting reel for use with a welding apparatus comprising an outwardly extending spindle, an inner disk mounted for rotation about said spindle and forming one side of a reel for receiving a coil of welding wire, a pair of posts extending outwardly from said inner disk in a direction parallel to said spindle, coil supporting means including a pair of arcuate members forming a generally circular core, means including bracing means extending inwardly from said arcuate members and said posts to said inner disk for supporting said arcuate members from said disk to transfer the weight of the welding wire placed thereon to the spindle, said arcuate members being pivoted at one of their ends upon an axis parallel to the spindle and having their opposite ends free, a second disk forming the other side of said reel and supported from said inner disk, and means for forcing said arcuate members outwardly about their pivots under pressure to expand said core within a coil of welding wire placed thereon.

References Cited in the file of this patent

UNITED STATES PATENTS

| | | |
|---|---|---|
| 1,093,284 | Mehlum | Apr. 14, 1914 |
| 1,341,003 | Pyburn | May 25, 1920 |
| 1,346,812 | Duston | July 20, 1920 |
| 1,831,848 | Doney et al. | Nov. 17, 1931 |
| 2,189,399 | Lewbers | Feb. 6, 1940 |